(12) United States Patent
Holmes et al.

(10) Patent No.: US 7,162,395 B1
(45) Date of Patent: Jan. 9, 2007

(54) COSPAS-SARSAT BEACON TESTER IN A REMOVABLE EXPANSION CARD FOR A HANDHELD COMPUTING DEVICE

(75) Inventors: Kevin Holmes, Kelowna (CA); William A. Street, Kelowna (CA)

(73) Assignee: Jodanti Enterprises Ltd., Kelowna (CA)

( * ) Notice: Subject to any disclaimer, the term of this patent is extended or adjusted under 35 U.S.C. 154(b) by 0 days.

(21) Appl. No.: 11/232,003

(22) Filed: Sep. 22, 2005

Related U.S. Application Data (60) Provisional application No. 60/611,738, filed on Sep. 22, 2004.

(51) Int. Cl.
*G06F 15/00* (2006.01)

(52) U.S. Cl. .................. 702/188; 702/106; 702/116; 702/117; 702/118; 702/186; 455/67.11; 710/104; 710/302

(58) Field of Classification Search .............. 702/188, 702/116–118, 186, 106; 342/165, 385; 710/104, 710/301, 302; 343/703; 455/67.11, 67.14, 455/404.1, 404.2, 456.1, 456.6, 461, 458
See application file for complete search history.

(56) References Cited

U.S. PATENT DOCUMENTS

| 5,519,577 | A | 5/1996 | Dudas et al. |
| 5,671,374 | A | 9/1997 | Postman et al. |
| 6,289,464 | B1 | 9/2001 | Wecker et al. |
| 6,353,870 | B1 | 3/2002 | Mills et al. |
| 6,842,652 | B1 | 1/2005 | Yeung |
| 6,992,623 | B1 * | 1/2006 | Street ..................... 342/385 |
| 2005/0235086 | A1 * | 10/2005 | Mills et al. ............... 710/301 |

* cited by examiner

*Primary Examiner*—Marc S. Hoff
*Assistant Examiner*—Phuong Huynh
(74) *Attorney, Agent, or Firm*—Antony C. Edwards (57) ABSTRACT

A remote tester for a radio frequency beacon includes a plug-in module insertable into a cooperating slot in a handheld computing device so as to communicate data between the module and the computing device, wherein the module includes an antenna, at least one radio frequency receiver cooperating with the antenna so as to receive radio frequency signals from the beacon, a processor cooperating with the receiver, and a host interface for coupling in the slot with the computing device for data interchange between the processor in the module and a processor in the computing device.

28 Claims, 8 Drawing Sheets

Beacon Test Report

Tested By:
Date:
Tester Model/Serial No./File Name:
Tester Cal Due Date:
Tester Temperature: 24°C

☐ PASS   ☐ FAIL   INITIALS: ________

Notes: Add text comments here.

U.I.N: 9D0D538B14001DD
Full Hex: FFFE2FCE86A9C58A000EEED313663B77767B
Burst Mode: Normal Mode (Long)
Protocol: Serial EPIRB Automatic Protocol
National use: Not Used
C/S Approval #: 119
Serial Number: 320197
Auxiliary Radio: 121.5 MHz
Position Source: Internal GPS
Latitude: N 49°52'00"
Longitude: W 119°28'00"

406 MHz Measurements
Frequency (EXT REF): 406.027699 MHz
Power (5 Watt): 37.3 dBm
Power Rise Time: : < 5 ms
Phase Deviation: -1.12 +1.07 radians
Modulation Rise Time: 105 uS
Modulation Fall Time: 153 uS
Modulation Symmetry: 0.3%
Modulation Bit Rate: 399.8 bps
CW Preamble: 159.8 ms
Stability Measure @ 36 Bursts
  Nominal Frequency: 406024386.035 Hz
  Short Term: 1.92E-10/100ms
  Mean Slope: 3.58E-10/minute
  Residual: 2.06E-10

121.5 MHz Measurements
Frequency (EXT REF): 121.499250 MHz
Power (5 Watt): 15.1 dBm
Sweep Direction: Downwards
Audio Frequency: 437 Hz to 1437 Hz
Sweep Range: 1000 Hz
Sweep Rep Rate: 2.5 Hz
Modulation Factor: 84 %
Duty Cycle: 37 %

FIG 7

COSPAS-SARSAT BEACON TESTER IN A REMOVABLE EXPANSION CARD FOR A HANDHELD COMPUTING DEVICE

CROSS REFERENCE TO RELATED APPLICATION

This application claims priority from U.S. Provisional Patent Application No. 60/611,738 filed Sep. 22, 2004 entitled Cospas-Sarsat Beacon Tester.

FIELD OF THE INVENTION

This invention relates to the field of plug-in peripheral application modules for use in handheld computing devices such as so-called personal digital assistants, and in particular to such an application plug-in card or module for use in remotely testing data from a radio frequency beacon.

BACKGROUND OF THE INVENTION

Cospas-Sarsat is a satellite system designed to provide distress alert and location data to assist search and rescue (SAR) operations, using spacecraft and ground facilities to detect and locate the signals of distress beacons operating on 406 Megahertz (MHz), 121.5 MHz or 243 MHz. An important feature of 406 MHz emergency beacons is the addition of a digitally encoded message, which provides such information as the country of beacon registration and the identification of the vessel or aircraft in distress, and optionally, position data from onboard navigation equipment. An auxiliary transmitter (121.5 MHz or 243 MHz) is usually included in the 406 MHz beacon to enable suitably equipped SAR forces to home on the distress beacon. To ensure that 406 MHz beacons are compatible with the Cospas-Sarsat System, detailed specifications and type approval testing standards have been adopted. Periodic testing of the Cospas-Sarsat beacons is required to ensure functionality of the beacons and to indicate whether these devices still meet the requirement standards of Cospas-Sarsat. Consequently, it would be desirable, and it is an object of the present invention to provide, a portable handheld device for testing of such beacons, and in particular a plug-in card or module or the like (collectively alternatively referred to herein as a module) for use with a handheld computing device (HCD) such as a personal digital assistant (PDA) for such testing.

As noted by Mills et al. in U.S. Pat. No. 6,353,870 which issued Mar. 5, 2002, a problem in the prior art, and one which is purportedly addressed by Mills et al., is the limited capabilities for expansion or customization, a PDA being provided with at most one or two slots for removable expansion cards for input/output (I/O), I/O adapters, memories and memory adapters including expansion cards having DRAM, SRAM, ROM, Flash technologies. It is noted that I/O expansion cards also have included dedicated peripherals, networking, modems, wireless communications, serial I/O, and bar-code and other scanners.

Also in the prior art of which applicant is aware, U.S. Pat. No. 5,671,374 which issued Sep. 23, 1997 to Postman et al. discloses the use of a PDA or similar host equipped with PC card interfaces for I/O devices including portable laser scanners, magnetic stripe and ink readers, key boards and key pads, OCR devices, and track balls. Postman et al. introduce the abstract to their specification by stating that a variety of PC card interfaces interface from many different types of input devices to PDAs or palm-top computers through PCMCIA slots so that the PDAs receive data from barcode scanning engines, and so as to decode the data and pass the decoded data to the PDA via PCMCIA pin bus. Applicant is also aware of U.S. Pat. No. 6,842,652 which issued Jan. 11, 2005, to Yeung which discloses a camera or image capture device insertable into an expansion slot of a handheld PC or PDA.

Also in the prior art, applicant is aware of U.S. Pat. No. 5,519,577 which issued May 21, 1996 to Dudas et al. wherein embodiments are taught for a PC card-based radio for applications based in a portable host so that, as taught by Dudas et al., when used with a local area network installed within a facility, a scanner or other device may communicate directly with a computer that manages inventory in the facility, the example given of using a spread spectrum radio for use in a portable barcode scanner.

What is neither taught nor suggested, and what it is one object of the present invention to provide, is the mounting of a radio frequency receiver into an insertable housing shaped to conform with the form factor for a plug-in peripheral card or module for use with a HCD such as a PDA, wherein the receiver section is left protruding from the HCD for two-way radio communication from an exposed end of the plug-in card or module. The opposite plug-in end of the card or module is releasably mounted in co-operating communication with the processor within the HCD.

Applicant is also aware of U.S. Pat. No. 6,289,464 which issued Sep. 11, 2001 to Wecker et al. as describing a system and method for receiving wireless information on a portable computing device which includes powering the wireless receiver of the device only from a battery of the portable computing device. The device receives wireless information and stores the wireless information in the memory of the wireless receiver. It is neither taught nor suggested, and is an object of the present invention to also provide, without intending to be limiting, a radio frequency antenna, RF radio and interface controller mounted within the housing of the plug-in card or module so as to be substantially enclosed within the body of the wherein the processing of the information received remotely from a beacon through the beacon tester plug-in module according to the present invention, is tested and specified parameters decoded so as to be graphically displayed on the display of the HCD.

SUMMARY OF THE INVENTION

In summary, the present invention may be characterized in one aspect as a remote tester for a radio frequency beacon, wherein the tester includes a plug-in module insertable into a cooperating slot in a handheld computing device so as to communicate data between the module and the computing device, and wherein the module includes an antenna, at least one radio frequency receiver cooperating with the antenna so as to receive radio frequency signals from the beacon, a module processor mounted in the module and cooperating with the at least one receiver so as to process data from the at least one receiver, a host interface for coupling in the slot with the computing device for data interchange between the processor in the module and a module processor in the computing device. One or both processors include means such as programmed software applications resident and operating in the processors for analyzing the data. The at least one receiver may include a 406 MHz receiver, and a 121.5 MHz receiver, or a 243 MHz receiver.

In one embodiment the module has a first end and an opposite second end insertable into the slot so as to leave the first end of the module exposed when the module is mounted in the slot. Advantageously, the antenna is mounted in the first end of the module.

The means for analyzing the data may include means for, and in a corresponding method according to the present invention the steps of: computing frequency and/or frequency stability from the data, decoding a Cospas-Sarsat protocol from the data, computing power from the data, computing modulation symmetry from the data, decoding Morse code from the data, listening to demodulated audio from the data, and/or computing a spectral analysis from the data. The module may further comprise a means for receiving an external clock reference signal, or a means for receiving the radio frequency signals from the beacon by way of an electrically conductive conduit mountable into radio frequency communication with the at least one receiver in the module.

A method according to another aspect of the present invention of remotely testing a radio frequency beacon comprising the steps of:

a) providing a plug-in module comprising a beacon tester card for mounting in data communicating interface within a cooperating slot in a handheld computing device, wherein the card includes an antenna, at least one radio frequency receiver cooperating with the antenna so as to receive radio frequency signals from the beacon, a module processor cooperating with the at least one radio frequency receiver, a host interface for coupling in the slot with the computing device for data interchange between the module processor and a processor in the computing device, b) configuring the handheld computing device so that both the processor and memory resident in the handheld computing device and a display of the handheld computing device will process data from the module and store and display the results of processing of the data so as to indicate values for specified parameters allowing for assessment of the functioning of the beacon, c) insertably mounting the module into the slot so as to interface, for data communication between, the host interface and the processor, and so as to provide power to the module from the computing device, d) bringing the module and the handheld computing device into within a radio frequency receiving range proximal to the beacon, e) detecting and receiving in the module radio frequency signals emitted by the beacon, f) transmitting data corresponding to the received signals from the module via the host interface to the processor of the handheld computing device, g) computing from the data at least the values of the specified parameters for evaluation of the functioning of the beacon.

DETAILED DESCRIPTION OF EMBODIMENTS OF THE INVENTION

As used herein, it is understood that reference to a Compact Flash™ is not intended to be limiting, but is intended to include other removable expansion card form factors or other application plug-in modules accommodating the space requirements and interface characteristics of the acceptable form factors for mounting of the application plug-in modules, memory cards, expansion cards, and other peripheral interface plug-in devices (collectively and alternatively referred to herein as plug-in modules) into the openings, apertures, expansion slots or the like (collectively alternatively referred to herein as slots) provided in HCDs or other portable computing devices including PDAs herein collectively and alternatively referred to as either HCDs, host devices or host computing devices.

Thus what is provided in the plug-in module according to the present invention is a beacon tester card for mounting in communication with the host computing device using a plug-in module inserted into an expansion card slot, so that the auxiliary functions unique to the beacon tester are found within the plug-in module, and the processing, display and memory functions, etc. are of the host computing device.

Figure 1:
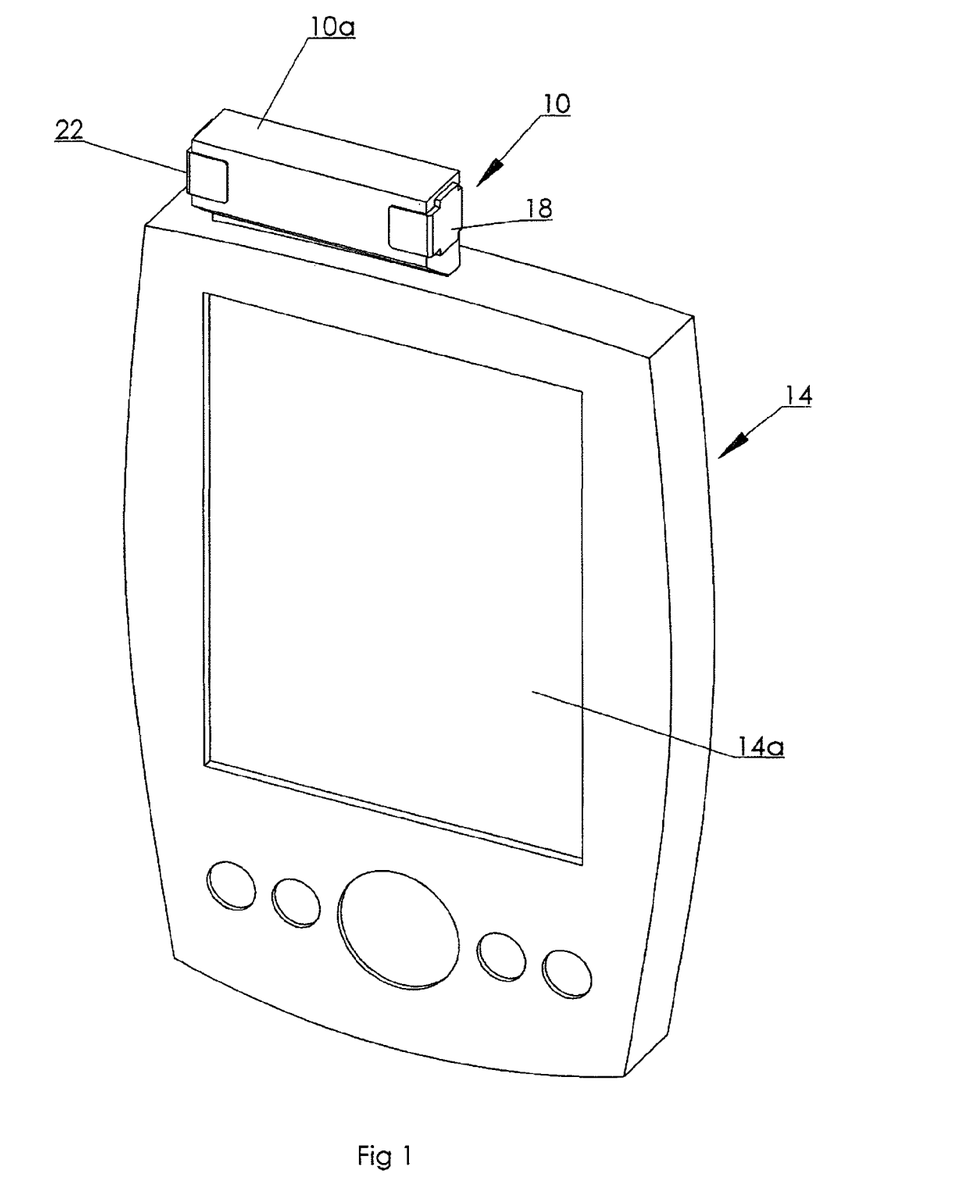
FIG. 1 is, in perspective view, a plug-in module according to the present invention mounted into the expansion slot of a PDA.
Figure 2:
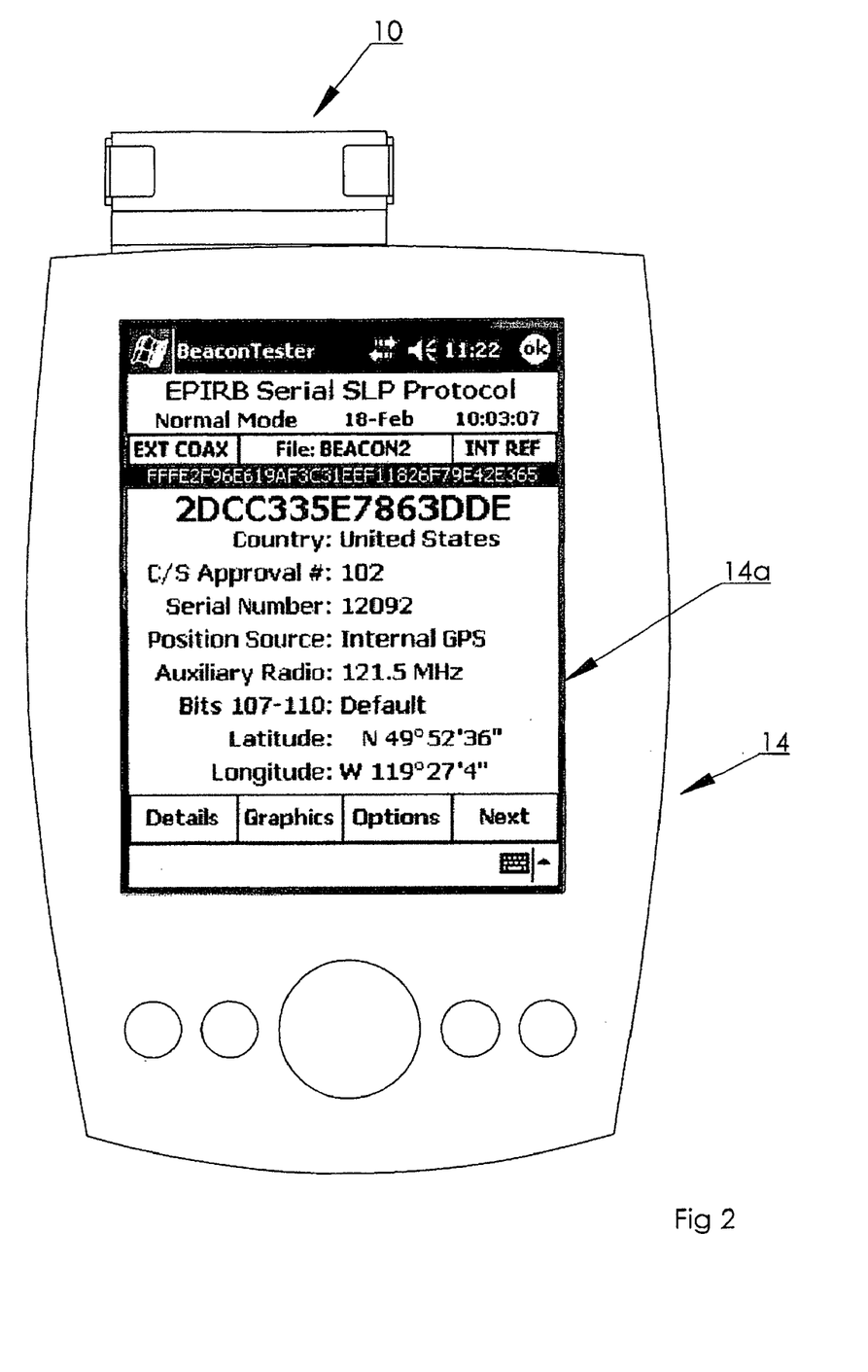
FIG. 2 is, in front elevation view, the plug-in module and PDA of FIG. 1 illustrating information received from a Cospas-Sarsat beacon being tested.
Figure 3:
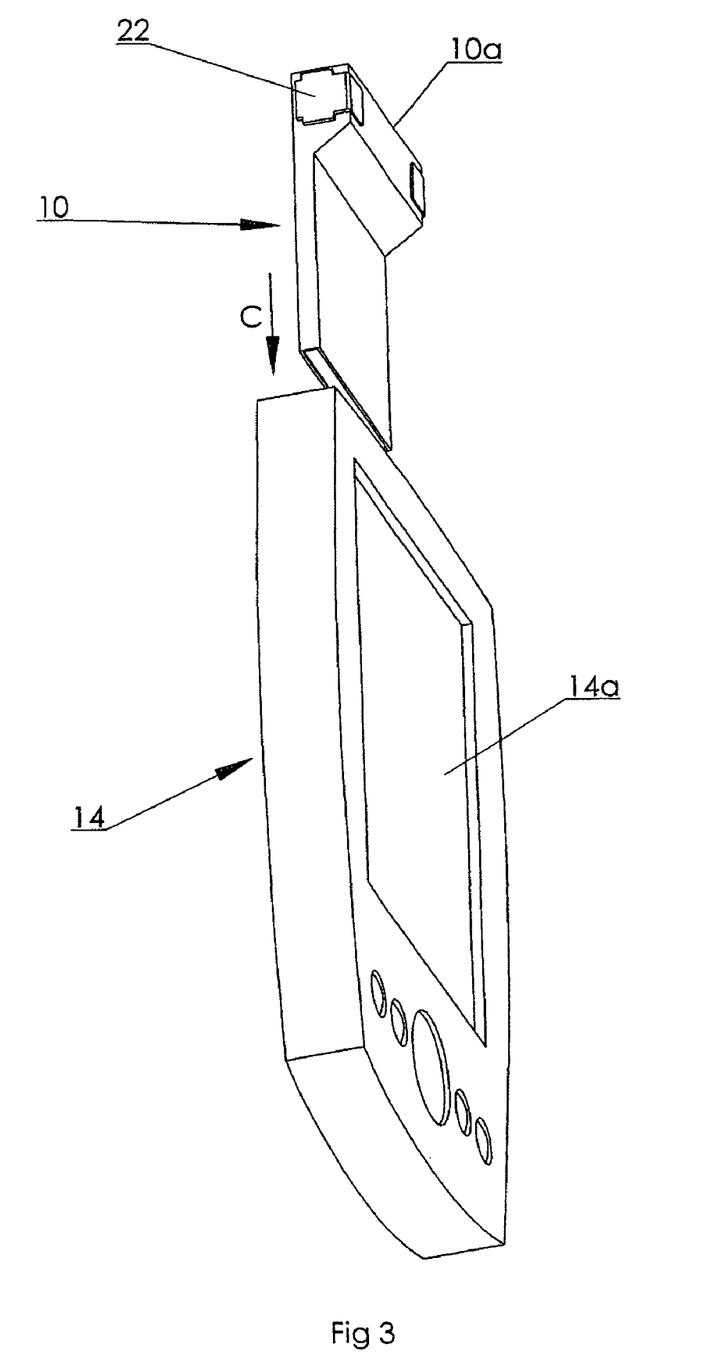
FIG. 3 is, in left side bottom view, the plug-in module of FIG. 1 being inserted into the expansion slot of the PDA.
Figure 4:
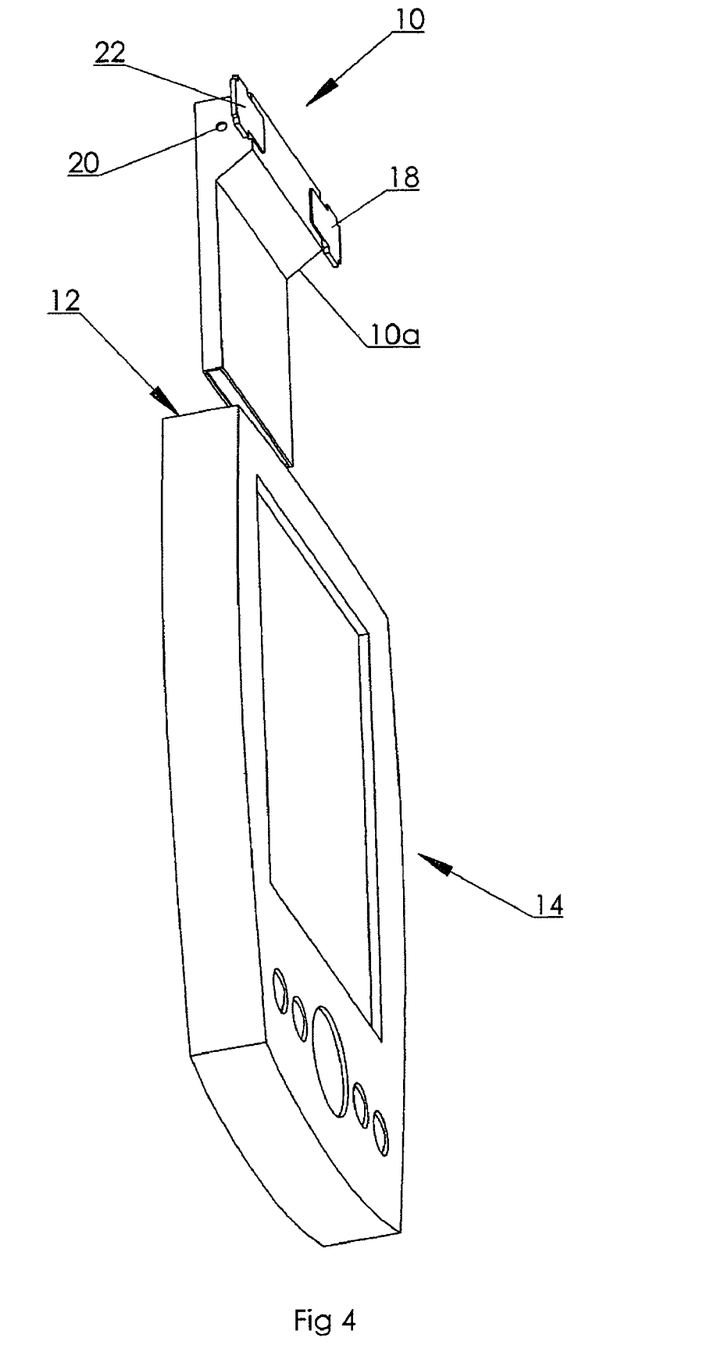
FIG. 4 is the view of FIG. 3 with the resilient caps on the exposed end of the plug-in module opened to provide access to the input ports.
Figure 4A:
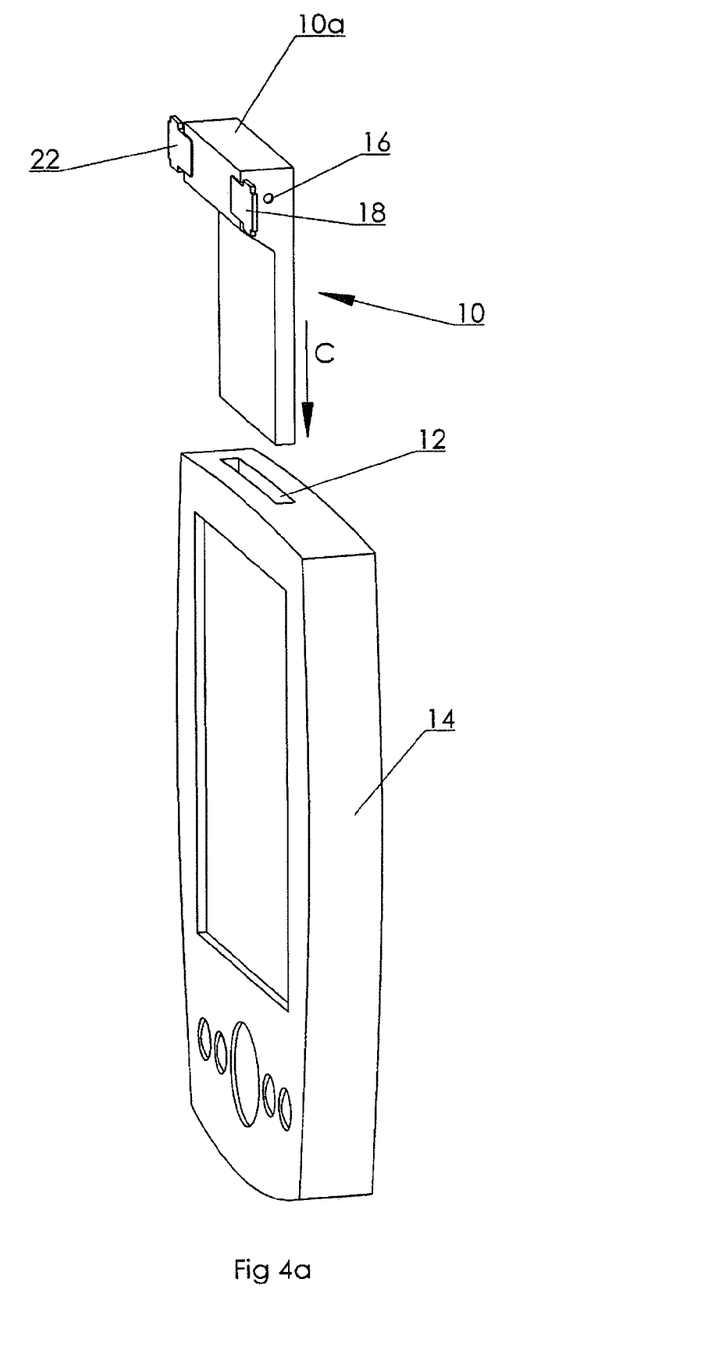
FIG. 4a is, in right side top perspective view, the plug-in module of FIG. 4 being inserted into the expansion slot of the PDA.

Although the Cospas-Sarsat authority and regulations regulate and control the 406 MHz band for use in beacons, it has not heretofore been a straight-forward exercise to use a single portable small handheld computing device to test the 406 MHz and auxiliary homing frequency of 121 MHz and the 243 MHz frequencies as employed by a beacon. In the present invention, the plug-in module provides for analysis of both power and frequency including in some embodiments frequency stability on all such three frequencies, namely, 406, 121, and 243 MHz. In addition, in a preferred embodiment, the beacon tester according to the present invention measures wave form characteristics of all three received frequencies and may in addition measure the following parameters, which are not intended to be limiting:

The Cospas-Sarsat C/S T.007 annex J Beacon Quality Assurance Plan requires frequency stability measurements. The device according to the present invention is illustrated in FIGS. 1–4, wherein corresponding reference numerals denote corresponding parts in each view. In use beacon testing module 10 is mounted into the expansion slot 12 in HCD 14, which in illustration is a PDA such as a Dell X50. In use, module 10 is inserted into slot 12 in HCD 14 in direction C. A user of the device may in one embodiment provide a stable 10 MHz frequency reference signal by plugging in a suitable mating connector (not shown) into the 10 MHz reference input located under the right hand resilient cap 18 illustrated in front perspective view in FIGS. 4 and 4a. For use in a non-wireless application, an external coaxial cable input port 20 is located on the opposite side of module 10 to the 10 MHz reference input 16, and similarly is located under a corresponding resilient cap 22 so as to provide for direct radio frequency input. An internal antenna 24 is mounted within the exposed end 10a of the plug-in module 10 and provides for 406 MHz reception remote from a beacon (not shown) being tested.

Figure 5:
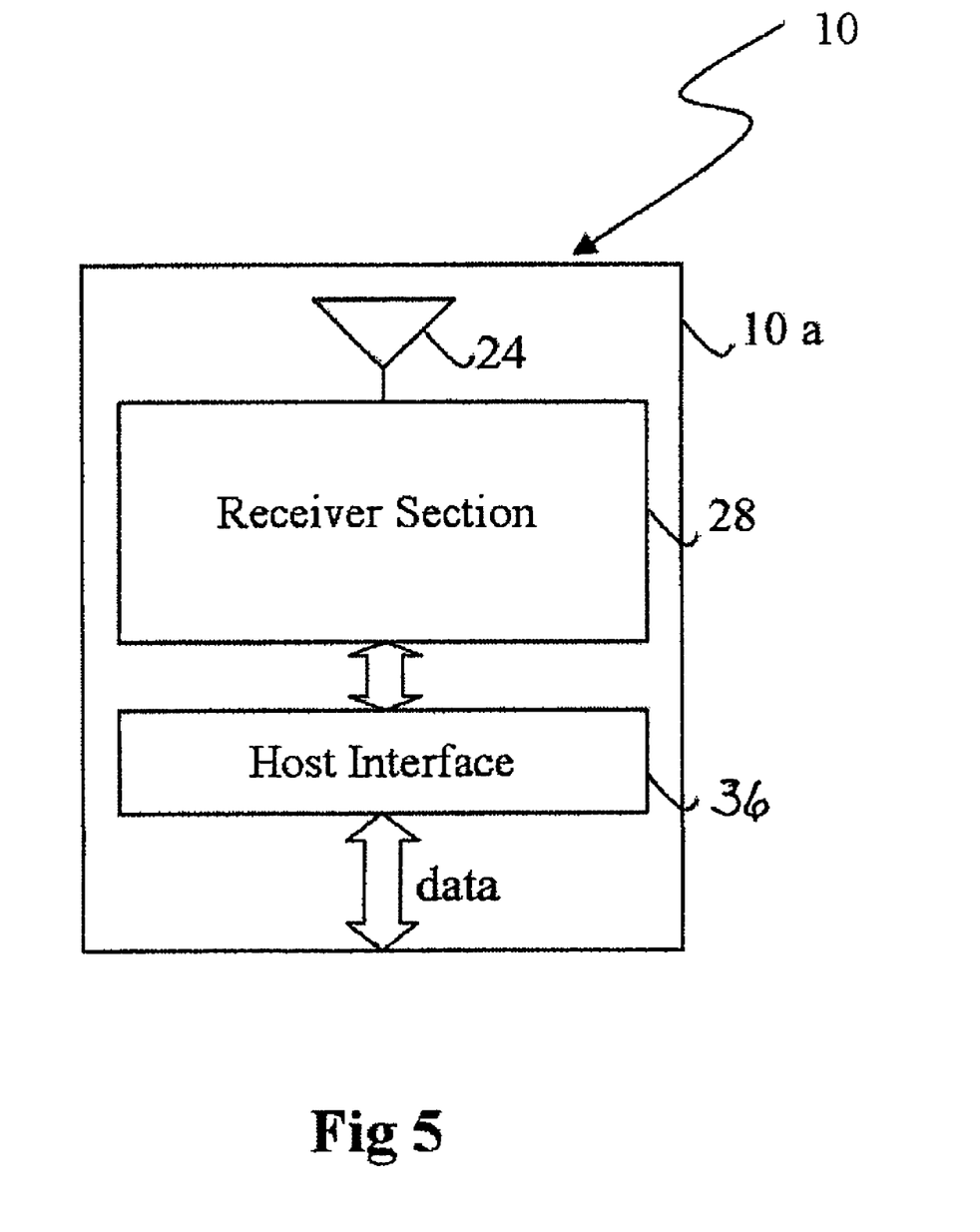
FIG. 5 is a block diagrammatic of the arrangement of antenna, receiver section and host interface within the plug-in module according to the present invention.
Figure 6:
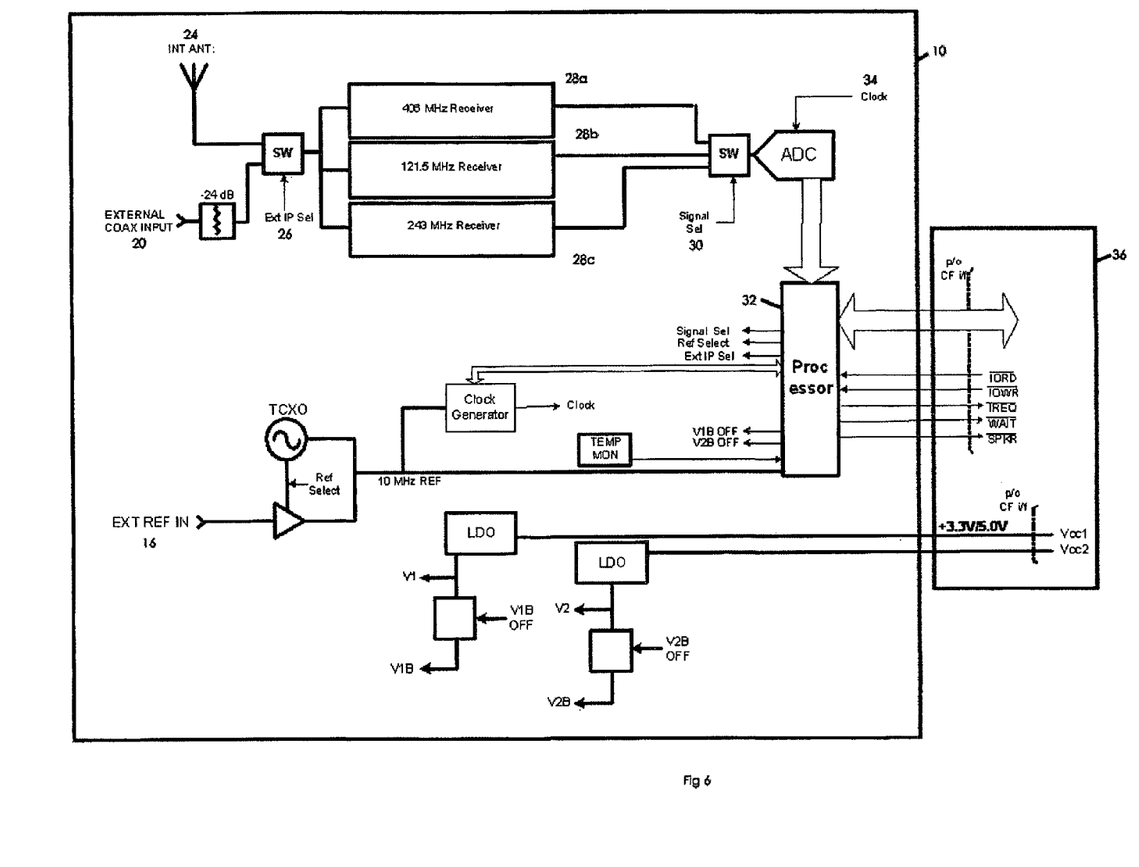
FIG. 6 is a block schematic representation of the signal processing within the plug-in module in the beacon tester according to the present invention.

As seen in FIG. 5, and in better detail in FIG. 6, module 10 contains internal antenna 24 within the exposed end 10a. A switch 26 allows a user to switch between the use of antenna 24 and external input 20 for receiving the radio frequency signal from the beacon being tested. The signal from the beacon is communicated to a receiver section 28 which in the embodiment of FIG. 6 comprise 406 MHz receiver 28a, 121.5 MHz receiver 28b, and 243 MHz receiver 28c. Switch 30 provides for selecting the signal from the corresponding receiver for feeding to processor 32. A clock signal 34 is provided to an analog to digital converter (ADC). As stated above, an external 10 MHz reference signal may also be provided by external reference input 16 to processor 32. The receiver section 28 and processor section 32 are enclosed within module 10 and the data then passing via host interface 36 into the HCD 14. Module 10 thereby takes advantage of the computing capabilities resident within the HCD.

Figure 7:
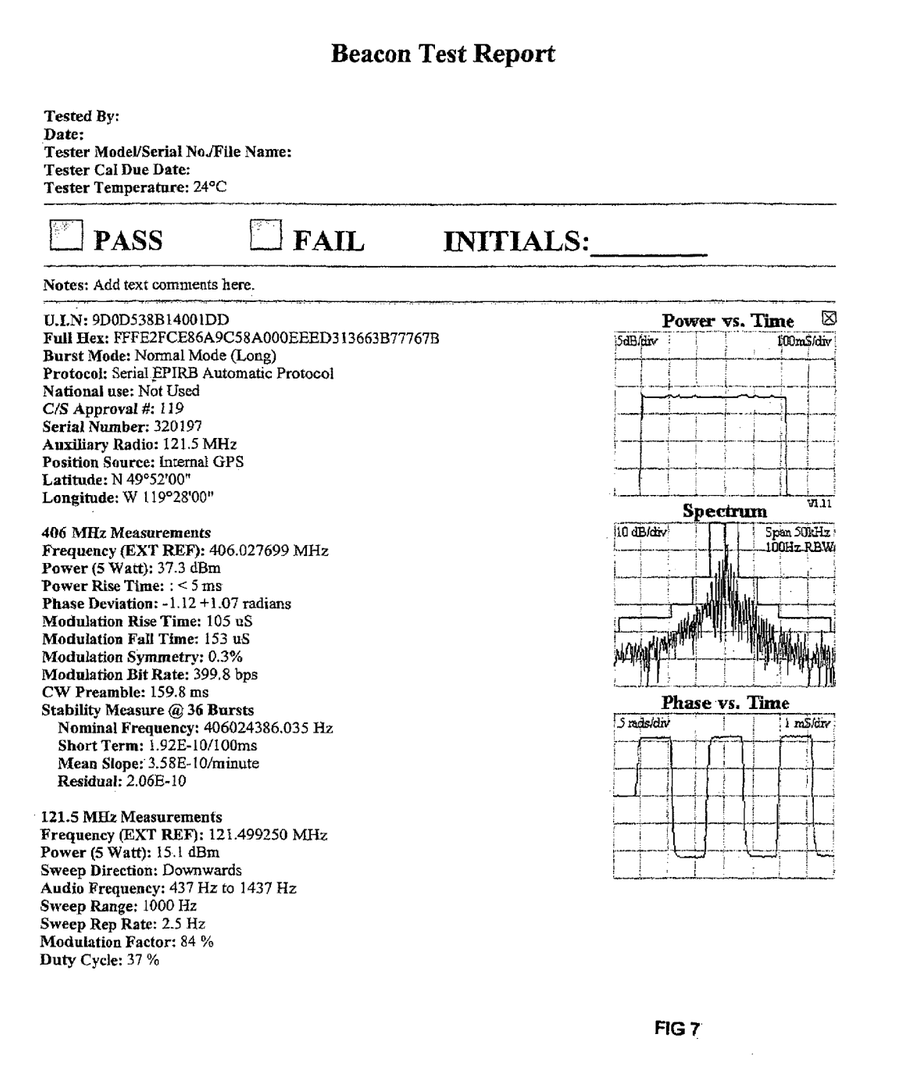
FIG. 7 is, a sample beacon test report illustrating a display of power versus time, spectrum, and phase versus time representative of the results of testing of a Cospas-Sarsat beacon using the beacon tester according to the present invention.

In a preferred embodiment, in embodiments of the present invention providing for frequency stability measurements, a delimited text file is produced for input into a spreadsheet, database, graph or document within the application software operating within HCD 14. The processing software decodes Cospas-Sarsat protocols on Cospas-Sarsat frequency channel allocations, within the 406 MHz to 406.1 MHz band. Thus the detailed parameters set out in Tables A and B and FIG. 7 are measured and may be converted to corresponding graphic displays which may be displayed on HCD display 14a, and such as seen by way of example in the Test Report of FIG. 7, and in particular which show, respectively, examples of 406 MHz phase modulation (Phase vs. Time), 406 MHz power (Power vs. Time) during a burst beacon transmission so as to check for any battery problems, and a 406 MHz in-band spectrum (spectrum) so as to provide a virtual spectrum analyser to check for spectral mask violations.

In embodiments testing for frequency stability, measurements may include a burst count, a average repetition rate, the frequency detected, the nominal frequency value, the short term, the mean slope, the residual frequency, and the test duration time. Connecting the external 10 MHz frequency reference provides for a very accurate frequency measurement.

In one embodiment, the internal antenna 24 mounted within the plug-in module 10 receives the transmitting beacon signal within a range of up to ten meters (for 406 MHz), or again, a direct input connection for example by using a coaxial cable connecter, allows for measurement directly from the output of a screen box or 5 Watts (W) directly from the beacon. The application software automatically saves the measured data within the memory and retrieval system (not shown) incorporated into the HCD and may create a file such as an HTML file for printing a test report on a remote or networked printer.

Although the application cited herein is that of 406, 121.5, 243 MHz frequency applications, those are not intended to be limiting as it is intended to be within the scope of the present invention to provide for measuring other frequencies used in emergency locating beacons.

In a preferred embodiment, the present invention provides for real-time audio on 121.5 MHz or 243 MHz frequencies and a further preferred embodiment may also decode Morse code.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

TABLE A

| 406 MHz | 121 MHz | 243 MHz |
| --- | --- | --- |
| Measure all Cospas-Sarsat frequency channels | Frequency | Frequency |
| Decode all Cospas-Sarsat protocols | Peak power | Peak power |
| Display UIN and full HEX | Sweep Direction | Sweep Direction |
| Frequency | Audio Frequency | Audio Frequency |
| Frequency stability | Sweep Range | Sweep Range |
| Power | Duty Cycle | Duty Cycle |
| Power Rise Time | Modulation Factor | Modulation Factor |
| Phase Modulation | Sweep Repetition Rate | Sweep Repetition Rate |
| Modulation Symmetry | Listen to Demodulated Audio | Listen to Demodulated Audio |
| Modulation Bit Rate CW Preamble | Decode Morse Code | Decode Morse Code |

TABLE B

| | Accuracy |
| --- | --- |
| Parameter provided: | |
| 406 MHz Measurements | |
| Measure all Cospas-Sarsat Frequency Channels | |
| Decode all Cospas-Sarsat Protocols | |
| 15 HEX ID & Full HEX | |
| Frequency (using INT REF) (resolution = 100 Hz) | |
| Leaving Factory | ±100 Hz |
| Long Term | ±0.4 ppm/year |
| Frequency (using EXT REF) (resolution = 1 Hz) | ±1 Hz |
| Frequency - Nominal Frequency | $\pm 2.5 \times 10^{-11}$ |
| Stability     Short Term | |
|     Medium Term - Mean Slope | |
|     Medium Term - Residual | |

TABLE B-continued

| | Accuracy | |
|---|---|---|
| Power | ±1 dB | |
| Power Rise Time | ±0.5 ms | |
| Phase Modulation | ±0.04 rad | |
| Modulation Rise and Fall Times | ±10 µs | |
| Modulation Symmetry | ±0.005 | |
| Modulation Bit Rate | ±0.2 bps | |
| CW Preamble | ±0.8 ms | |
| 121.5/243 MHz Measurements | | |
| Frequency (using INT REF) (resolution = 100 Hz) | | |
| Leaving Factory | ±100 Hz | |
| Long Term | ±0.4 ppm/year | |
| 121.5 Frequency (using EXT REF) (resolution = 1 Hz) | ±30 Hz | |
| 243 Frequency (using EXT REF) (resolution = 1 Hz) | ±30 Hz | |
| 121.5 Peak Power | ±1.5 dB | |
| 243 Peak Power | ±1.5 dB | |
| Sweep Direction | — | |
| Audio Frequency | ±30 Hz | |
| Duty Cycle | ±2% | |
| Modulation Factor | ±5% | |
| Sweep Repetition Rate | ±0.1 Hz | |
| Graphic 406 Power screen | | |
| Graphic 406 Phase Modulation screen | | |
| Graphic 406 In-Band Spectrum screen | | |
| Miscellaneous | | |
| Range (using Internal Antenna): 406 MHz | >10 m | |
| 121.5 MHz | >3 m | |
| RF Input VSWR | 1.10:1 | |
| RF Input Level: 406 MHz Burst | −13 dBm Min | +40 dBm Max |
| 121.5 MHz | −28 dBm Min | +31 dBm Max |
| 10 MHz REF Input VSWR | 1.15:1 | |
| 10 MHz REF Input Level | −10 dBm Min | +10 dBm Max |
| Operating Temperature Range | 0° C. to +50° C. | |
| Storage Temperature Range | −20° C. to +60° C. | |
| Internal Temperature Sensor Accuracy | ±0.5° C. | |
| RF Input Cable Termination | BNC-female | |
| 10 MHz REF Cable Termination | SMA-female | |
| Dimensions: w × l × h mm (inches) | 43.5 (1.71) × 58.5 (2.30) × 12.7 (0.50) | |
| in PDA w × l × h mm (inches) | 73 (2.87) × 140 (5.50) × 16.5 (0.65) | |

*User must supply a stable 10 MHz Reference Signal

What is claimed is:

1. A remote tester for a radio frequency beacon, the tester comprising:
   a plug-in module insertable into a cooperating slot in a handheld computing device so as to communicate data between said module and said computing device,
   wherein said module includes an antenna, at least one radio frequency receiver cooperating with said antenna so as to receive radio frequency signals from the beacon, a module processor mounted in said module and cooperating with said at least one receiver so as to process data from said at least one receiver, a host interface for coupling in said slot with said computing device for data interchange between said processor in said module and a module processor in said computing device.

2. The device of claim 1 wherein said module has a first end and an opposite second end insertable into said slot so as to leave said first end of said module exposed when said module is mounted in said slot.

3. The device of claim 2 wherein said antenna is mounted in said first end of said module.

4. The device of claim 2 wherein said at least one receiver includes a 406 MHz receiver.

5. The device of claim 2 wherein said at least one receiver includes a 121.5 MHz receiver.

6. The device of claim 2 wherein said at least one receiver includes a 243 MHz receiver.

7. The device of claim 1 further comprising means for analyzing said data.

8. The device of claim 7 wherein said means for analyzing includes means for computing frequency from said data.

9. The device of claim 7 wherein said means for analyzing includes means for computing frequency stability from said data.

10. The device of claim 7 wherein said means for analyzing includes means for decoding a Cospas-Sarsat protocol from said data.

11. The device of claim 7 wherein said means for analyzing includes means for computing power from said data.

12. The device of claim 7 wherein said means for analyzing includes means for computing phase modulation from said data.

13. The device of claim 7 wherein said means for analyzing includes means for computing modulation symmetry from said data.

14. The device of claim 7 wherein said means for analyzing includes means for decoding Morse code from said data.

15. The device of claim 7 wherein said means for analyzing includes means for listening to demodulated audio from said data.

16. The device of claim 7 wherein said means for analyzing includes means for computing a spectral analysis from said data.

17. The device of claim 1 wherein said module further comprises a means for receiving an external clock reference signal.

18. The device of claim 1 wherein said module further comprises a means for receiving the radio frequency signals from the beacon by way of an electrically conductive conduit mountable into radio frequency communication with said at least one receiver in said module.

19. A method of remotely testing a radio frequency beacon comprising the steps of:
   a) providing a plug-in module comprising a beacon tester card for mounting in data communicating interface within a cooperating slot in a handheld computing device, wherein said card includes an antenna, at least one radio frequency receiver cooperating with said antenna so as to receive radio frequency signals from the beacon, a module processor cooperating with said at least one radio frequency receiver, a host interface for coupling in said slot with said computing device for data interchange between said module processor and a processor in said computing device,
   b) configuring said handheld computing device so that both said processor and memory resident in said handheld computing device and a display of said handheld computing device will process data from said module and store and display the results of processing of the data so as to indicate values for specified parameters allowing for assessment of the functioning of the beacon,
   c) insertably mounting said module into said slot so as to interface, for data communication between, said host interface and said processor, and so as to provide power to said module from said computing device,
   d) bringing said module and said handheld computing device into within a radio frequency receiving range proximal to the beacon,
   e) detecting and receiving in said module radio frequency signals emitted by the beacon,
   f) transmitting data corresponding to the received signals from the module via the host interface to the processor of the handheld computing device,
   g) computing from the data at least the values of the specified parameters for evaluation of the functioning of the beacon.

20. The method of claim 19 further comprising the step of computing frequency from said data.

21. The method of claim 19 further comprising the step of computing frequency stability from said data.

22. The method of claim 19 further comprising the step of decoding a Cospas-Sarsat protocol from said data.

23. The method of claim 19 further comprising the step of computing power from said data.

24. The method of claim 19 further comprising the step of computing phase modulation from said data.

25. The method of claim 19 further comprising the step of computing modulation symmetry from said data.

26. The method of claim 19 further comprising the step of decoding Morse code from said data.

27. The method of claim 19 further comprising the step of listening to demodulated audio from said data.

28. The method of claim 19 further comprising the step of computing a spectral analysis from said data.

* * * * *